P. E. BARKER.
DUMPING TRUCK.
APPLICATION FILED JUNE 21, 1920.
1,380,881.
Patented June 7, 1921.
2 SHEETS—SHEET 1.
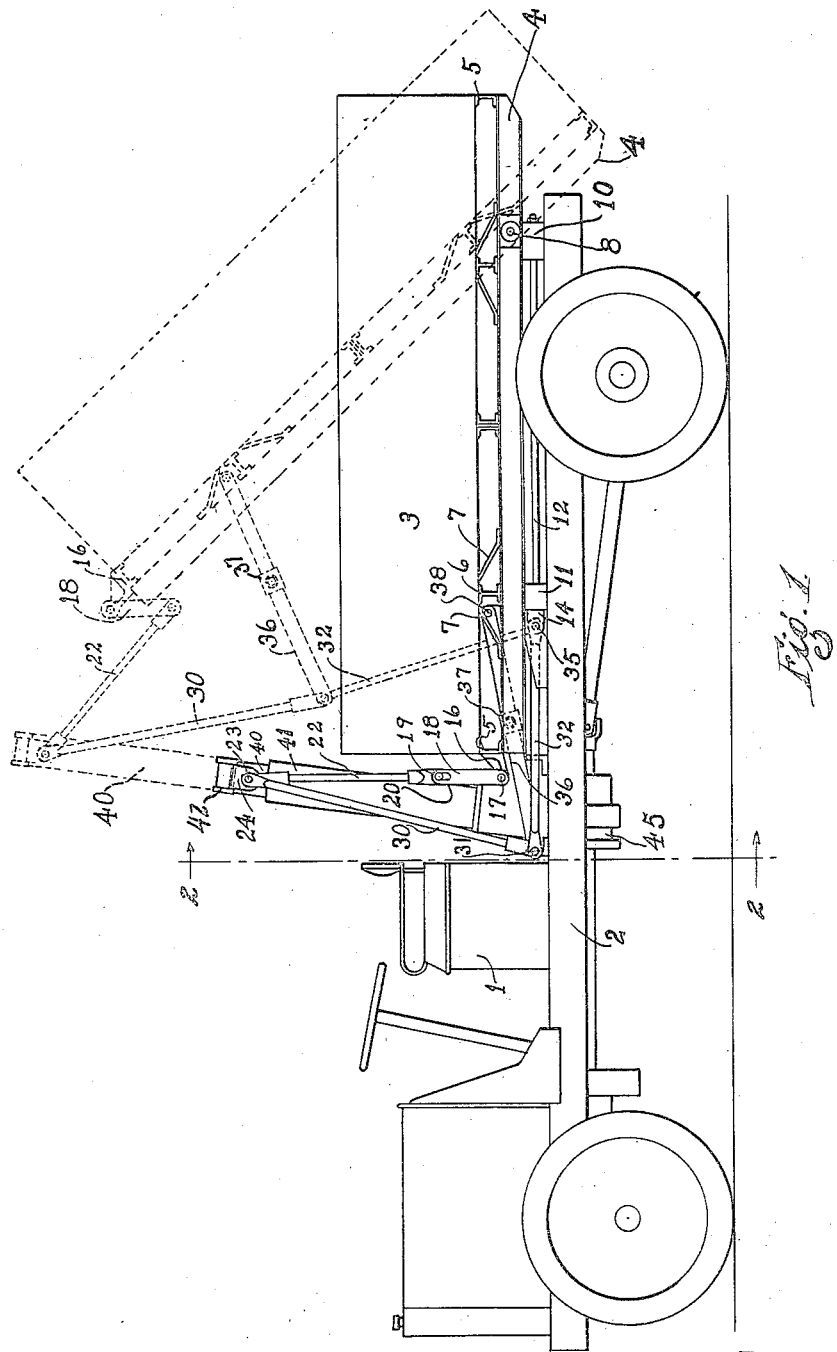

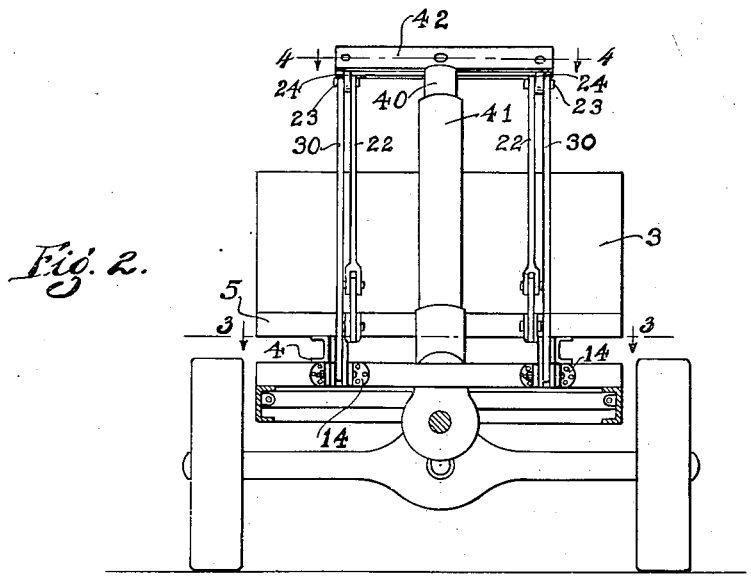

UNITED STATES PATENT OFFICE.

PERCY E. BARKER, OF CLEVELAND, OHIO, ASSIGNOR TO THE VAN DORN IRON WORKS COMPANY, OF CLEVELAND, OHIO, A CORPORATION OF OHIO.

DUMPING-TRUCK.

1,380,881.            Specification of Letters Patent.      Patented June 7, 1921.

Application filed June 21, 1920. Serial No. 390,412.

*To all whom it may concern:*

Be it known that I, PERCY E. BARKER, a citizen of the United States, residing at Cleveland, in the county of Cuyahoga and State of Ohio, have invented a certain new and useful Improvement in Dumping-Trucks, of which the following is a full, clear, and exact description reference being had to the accompanying drawings.

This invention relates to dumping trucks, particularly to automobile trucks of the type wherein an elavating apparatus is operated by the application of power, usually from the motor of the truck to tilt the pivoted truck body rearwardly thereby discharging the contents thereof.

An object of the invention is to provide an effective connection between the elevating apparatus and the tilting truck body whereby the lifting force may be more effectually delivered, and whereby the body may be tilted to an angle large in comparison with the amount of movement of the lifting member.

My invention is shown in the accompanying drawings as associated with dumping trucks employing a plunger type of elevating apparatus and a more specific object is to arrange a system of compound link mechanism whereby the movement of the lifting plunger transmits its lifting force first in an upward direction only, through one set of links, and later in a rearwardly direction to further lift and tip the body by means of another set of links.

A feature of my system of lifting links is concerned with the arrangement of these links so that in operation when the first set of links becomes idle, and the second set of links begins to act, and in lowering the link body this operation is reversed.

Additional objects include simplicity of construction and consequent cheapness of manufacture, as well as the arrangement of the parts so that they are not likely to get out of order, and also the position of the links so that no greater room or space is occupied than that required for the usual lifting mechanism for this type of truck.

My invention is hereinafter more fully described in connection with the accompanying drawings illustrating a preferred embodiment thereof.

The essential characteristics are set forth in the claims.

In the drawings Figure 1 is a side elevation of a truck equipped with my invention; Fig. 2 is a cross secton on line 2—2; Fig. 3 is a cross section on an enlarged scale on the line 3—3 Fig. 2; Fig. 4 is a section on line 4—4 Fig. 2; Fig. 5 is a detail perspective view of the clevis.

An automobile truck of any suitable design and construction is shown at 1 and is provided with a suitable frame structure 2, a body 3 which may be of the usual flat bottom type is shown as pivoted at 8 in any well known manner in order that it may swing to the dumping position as shown in broken lines in Fig. 1.

In order that a rigid construction may be had the truck body is indicated as provided with a longitudinal member 4, transverse end members 5 and transverse members 6 intermediate said end members. Suitable brace members may be provided as shown at 7. Transverse members 10 and 11 are shown upon the frame 2 and upon these members a truck body is adapted to rest when in normal position. A tie rod 12 may serve to connect members 10 and 11 in a rigid manner. A pair of bearing blocks 14 are shown as located adjacent each side of the truck in advance of cross members 11, said blocks serving to act as pivot points for a link construction presently to be described.

Brackets 16 are shown as attached adjacent to the front of the body 3, pivoted to these blocks at 17 are shown links 18, said links 18 may be slotted at 20 to receive a pivot pin 19 the latter serving to connect each link 18 with another link 22. The slot 20 provides a lost motion connection between the links 18 and 22. These links 22 may be pivoted at 23 to clevises 24 and these clevises may in turn be pivotally carried by a yoke 42. Members 30 of another set of links, coöperating with the first set to raise the truck body are shown as also pivoted to the clevises 24 and may extend downwardly and be connected to another pair of links 32 at 31. The links 32 are indicated as being pivotally connected to the bearing blocks 14 at 35.

It will be noted that the pair of link members 36 are shown as connected pivotally at 31 to the links 30 and 32, and also by pivots extending laterally of the truck body at 38. The links 30, 32 and 36 afford a toggle construction which is very effective in operation. The links 36 may each comprise two members rigidly connected at 37 to provide in effect a one piece construction.

The yoke members 42 may be pivotally secured at 43 to a plunger 40 shown as operating in a plunger casing 41. The means for operating the plunger may comprise the usual screw and gear connection driven, through connections indicated at 45, by the motor of the truck.

The operation of the device is as follows:—

Assuming the truck to be filled and that the contents are to be dumped, the operator throws the necessary parts into operation to cause the plunger to be raised, thereby carrying the yoke 42 upwardly. The yoke carries with it the links 22 and 30. The links 22 pull upwardly in turn the links 18, which being connected to the pivoted truck body begins to tilt the latter. Meanwhile the link 30 is moving links 32 and 36 about their pivot points. No pull, however, is during the first stages of the lift, contributed by the link 30, the entire load being lifted by the link 22, it being noted that this gives in effect a direct pull on the truck body.

At a certain point in the upward movement, which point may be made to vary by changing the lengths of the various elements, the link 22 will cease to lift and will begin to assume the position shown in dotted lines in Fig. 1. Just before the set of links 18—22 cease to operate, links 30, 32 and 35 come into operation. As will be apparent from the drawing, the straightening out of the members 30—32 to an approximately straight line causes the member 36 to be pushed rearward thereby pushing on and further tilting the truck body.

It will be noted that the operation of the links 22—18 is relatively slow, whereby the greatest power is available through that portion of the lifting movement where the load is greatest. The movement of the body when caused by the arms 36 is relatively fast, which movement can be readily effected by the screw plunger since at this portion of the lifting movement the load pull is not so great.

Having thus described my invention, what I claim is:

1. A dumping apparatus comprising a supporting frame, a dumping body pivotally carried by said frame and lifting mechanism comprising an elevating member and sets of links secured to the body and to said elevating member and arranged to independently control the position of the body at different stages of tilt.

2. A dumping apparatus comprising a supporting frame, a dumping body pivotally carried by said frame and lifting mechanism comprising sets of links secured to the body, each set comprising a pair of pulling members, and a common plunger connected to each set for operating said sets of links successively.

3. A dumping apparatus comprising a supporting frame, a dumping body pivotally carried by said frame and lifting mechanism comprising sets of links secured to the body, each set comprising a pair of pulling members, operative successively to raise said body, and a common operating member connected to each set for operating the links.

4. The combination in a lifting apparatus, of a supporting frame, a tiltable body carried by the frame, a lifting means, and a toggle device, one link of which is secured to the frame, a second to the lifting means and a third to the body, a lost motion connection between said links and body, and a set of links attached one to the lifting means and a second to the body, said toggle constituting a quick motion device and the other set adapted to fold to inoperative position when the toggle is holding the body in position.

5. A dumping apparatus comprising a supporting frame, a body pivotally carried by said frame, means for tilting said body, said means comprising a plunger and a link system, said link system comprising one set of links including three members, one of which is pivotally carried by the plunger, another by the body and a third by the frame, a common pivot for the three members, and a second set of links coöperating with said first set and means for operating said plunger.

6. A dumping apparatus comprising a supporting frame, a body pivotally carried by said frame, means for tilting said body, said means comprising a plunger and a link system, said link system comprising two coöperating sets of links, one set including three members, one of which is pivotally carried by the plunger, another by the body and a third by the frame, a common pivot for the three members, said second set of links comprising one member pivotally connected to the plunger and another pivotally supported on a bracket secured to the body, a lost motion connection between said last named members and means for operating said plunger.

7. A dumping apparatus comprising a supporting frame, a dumping body pivotally carried thereby, an upright plunger carried by the frame adjacent to the front end of the body, and lifting mechanism secured to the body and plunger and comprising sets of links arranged to independently control the position of the body at different stages of tilt.

8. A dumping apparatus comprising a supporting frame, a dumping body pivotally carried by said frame and lifting mechanism comprising a set of links secured to the body, each set comprising a pair of pulling members pivoted together and attached to different parts of said body and means for operating said links.

9. A dumping apparatus comprising a supporting frame, a dumping body pivotally carried by said frame and lifting mechanism comprising a set of links secured to the body, each set comprising a pair of pulling members, having a common pivot operative in sequence to raise said body and means for operating the links.

10. A dumping apparatus comprising a supporting frame, a tiltable body carried by the frame, a lifting means, and a toggle device comprising three links adapted to support and move the body independently during a portion of the operation, the intermediate one of which links is secured to said body.

11. A dumping apparatus comprising a supporting frame, a body pivotally carried by said frame, means for tilting said body, said means comprising a plunger and a link system, said link system including one set of links comprising one member pivotally supported by the plunger and another member pivotally supported on the body, a lost motion connection between said last named members, a second set of links and means for operating said plunger.

12. A dumping apparatus comprising a supporting frame, a body pivotally carried by said frame, means for tilting said body, said means comprising a plunger and a link system, said link system comprising sets of links, one set including three members, one carried by the plunger, another by the body and a third by the frame, said second set of links comprising one member pivotally supported on the plunger and another pivotally supported on the body, a lost motion connection between said last named members and means for operating said plunger.

13. A dumping apparatus comprising a supporting frame, a body pivotally carried by said frame and means for tilting said body, said means comprising a plunger and a link system, said system including two sets of links, one set comprising three members, one of which is pivotally carried by the plunger, another by the body and a third by the frame, a common pivot for the three members, said second set of links comprising one member pivotally supported by the plunger and another pivotally supported on the body, a lost motion connection between said last named member and means for operating said plunger.

14. A dumping apparatus comprising a supporting frame, a body pivotally carried by said frame, means for tilting said body, said means comprising a plunger and a link system, said system including two independent sets of links mutually coöperating to cause continuous movement of said body by successively controlling the position thereof.

15. A dumping apparatus comprising a supporting frame, a body pivotally carried by said frame, means for tilting said body, said means comprising a plunger and a link system, said system including three members, one of which is pivotally carried by the plunger, another by the body and a third by the frame and a common pivot for said three members each set being capable of operating the body without the other in certain stages of the tilting operation.

16. A dumping apparatus comprising a supporting frame, a body pivotally carried by said frame, means for tilting said body, said means comprising a plunger and a link system, said system including two coöperating sets of links, one set including three members, one of which is pivotally supported on the plunger, another on the body and a third on the frame, a common pivot for the three members, and said second set of links comprising one member pivotally supported by the plunger and another pivotally supported on a bracket secured to the body, a lost motion connection between said last two mentioned members and means for operating said plunger.

17. In a truck the combination of a supporting frame, a dumping body carried by said frame, a lifting member comprising a plunger, means to uniformly move said plunger, two sets of link members operated by said plunger and arranged to first give a uniform upward motion to said body and later to accelerate the motion thereof.

In testimony whereof, I hereunto affix my signature.

PERCY E. BARKER.